June 7, 1927.  
R. C. BENNER  
1,631,511  
STORAGE BATTERY  
Filed Feb. 29, 1924
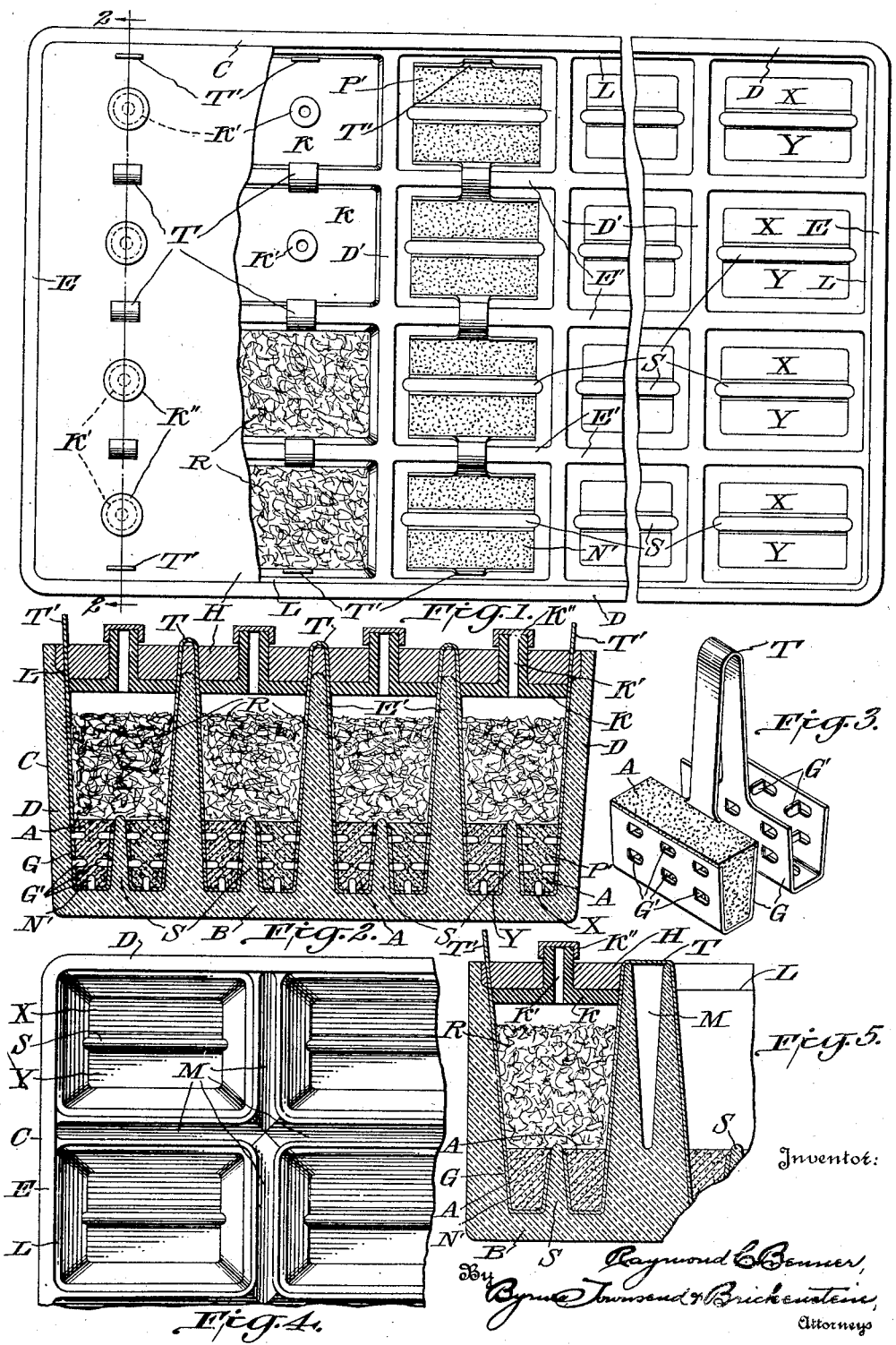

Patented June 7, 1927.

1,631,511

UNITED STATES PATENT OFFICE.

RAYMOND C. BENNER, OF BAYSIDE, NEW YORK, ASSIGNOR TO THE PREST-O-LITE COMPANY, INC., A CORPORATION OF NEW YORK.

STORAGE BATTERY.

Application filed February 29, 1924. Serial No. 696,029.

This invention relates to storage battery construction and more particularly to an improved multiple-cell storage battery and method of making the same.

The primary object of the invention is to provide a compact multiple-cell storage battery that has advantageous manufacturing features, and one that is especially adapted for use as a radio "B" battery which supplies a relatively high resistance circuit, but it will be understood that certain novel features of the invention are also applicable in other types of storage batteries.

The above and other objects and the novel features of the invention will be apparent from the following description taken with the drawings, in which Fig. 1 is a plan view of a storage battery embodying this invention, parts being omitted to more clearly illustrate the construction;

Fig. 2 is a transverse section of the improved battery on the line 2—2 of Fig. 1;

Fig. 3 is a view of one of the duplex electrodes of the battery; and

Figs. 4 and 5 are plan and sectional views of a part of another storage battery embodying this invention.

Broadly speaking, the improved storage battery comprises a one-piece multiple-cell container, each cell having a partition therein that divides the bottom portion of the cell into electrode compartments. These compartments are severally substantially filled by the positive and negative electrodes,—the partition serving as an imperforate separator that is at least as high as the electrodes in the bottom of the cell. The electrolyte, desirably carried by electrolyte absorbent material, is disposed in the space above the partition and electrodes, and cooperates with the latter in the electrolytic action of the cell. The cells may be electrically connected together as desired to obtain a wide range of voltages.

Referring to the drawings, the multiple-cell jar or container C is desirably an integral body of heat and acid-resistant non-conductive material, such as glass, that is moulded, pressed or otherwise formed into the desired shape to provide a number of groups of cells. The container body has a number of parallel walls E' between its end walls E, which are perpendicularly intersected by a number of parallel walls D' extending between the side walls D to form the rows of individual cells, which may taper toward their bottoms, as shown. Each cell has two separate electrode compartments X, Y in the bottom thereof, which are formed by a partition S that is integral with the bottom B of the container body and rises nearly half the height of the cell substantially parallel to the cell walls E'. The partition S thus provides an impervious separator between the positive and negative electrodes which are desirably of the block type and substantially fill the compartments X and Y.

The electrodes are similar in construction, each comprising a grid G that rests on the bottom of the cell and carries the active material A. As shown, each grid is desirably U-shaped or trough-shaped in form and of such size that it will snugly fit into the electrode compartment with its outside faces bearing against two sides and the bottom of the compartment. Tongues G' may be punched inwardly of the limbs of the grid to provide conducting means entering the body of active material, as well as retaining means for such material, and also to provide perforations to admit electrolyte to the interior of the block of active material. The upper edges of the grids are also desirably covered with a thin protective layer of active material.

The cells may be arranged in groups, connected in series transversely of the battery, as shown in Figs. 1 and 2. In such construction, the intermediate positive and negative grids may be formed in pairs, as units, to provide duplex electrodes, as illustrated in Fig. 3. Each duplex grid may be formed from a single sheet of lead antimony alloy or other suitable material, the two grids thereof being conductively connected by an inverted U-shaped integral strip or conductor T of sufficient height to extend a distance above the upper edge of the intervening cell wall E' and with its limbs fitting flat against the opposite faces of such wall leaving the upper edge of such wall exposed for sealing purposes, which will be explained. The grids of the end electrodes P', N' of each electrode group have single terminal strips T' integrally joined thereto and extending along a cell wall above the battery for connecting the group of cells in circuit with an adjoining group of cells or to other devices. The exposed bends of the conductors T may be used as intermediate terminals of a group of cells.

The active material A may be readily applied to the grids after such grids and the connectors and terminals have been fitted in place, the procedure depending upon the particular requirements, as whether a formed or preformed storage battery is to be produced.

In the manufacture of a battery which is to be formed before use, active material, such as a mixture of lead oxid and lamp black wet with water, is applied to both positive and negative grids at the same time, thus providing an inexpensive and effective method of pasting all the grids in a few minutes. After the active material has been deposited and tamped in solid to a level slightly above the top edges of the grids but below the upper edge of the partition S, it is set with the addition of sulfuric acid, whereupon it may be formed and permanized. However, in order to hasten the forming operation, after the active material has set, the sulfuric acid may be washed out and sodium carbonate or other suitable composition may be added. The electrodes are then washed free from sodium carbonate and permanized, as by placing the multi-cell jar containing the electrodes in a vacuum oven.

When a preformed battery is to be produced, a suitable cover or template is applied to the multi-cell jar so as to completely cover all electrode compartments of one polarity, leaving the other compartments exposed to receive active material, and vice versa. For example, all negative electrode compartments and the grids therein may be covered, leaving exposed the positive electrode compartments containing the positive grids. Positive active material, such as a mixture of lead peroxid, lead sulfate and sulfuric acid is sifted or otherwise deposited in all of the positive grids in one operation, without getting any of the positive material into the negative grids and electrode compartments. After the positive active material has been tamped in place to a level slightly above the upper edges of the grids, the multi-cell jar is desirably placed in an oven to bake the positive active material at about 100° C. for about six hours. After this baking operation, the covering form is removed from the negative electrode compartments and similarly set over the positive electrode compartments to protect the latter while the negative active material, such as sponge lead, is similarly deposited and tamped into all of the negative grids and compartments. The covering is then removed. Contamination of the positive and negative active materials is thus avoided.

In both types of batteries the cell spaces above the electrodes and the partitions or separators S communicate with the electrode compartments and are partly filled with a suitable absorbent material adapted to carry electrolyte through which the desired electrolytic action takes place between the pairs of electrodes in the individual cells. An electrolyte absorbent material R, such as a mixture of glass wool and sulfite wood pulp, is desirably packed in place in these electrolyte spaces, serving to retard leakage or spraying out of electrolyte during charging, and also in effect providing permeable covers for the electrode compartments to hold the blocks of active material in place therein but permit electrolytic action therebetween through the common layer of electrolyte on top of the electrodes.

After the absorbent material has been thoroughly tamped in place, individual vented covers K of acid-resistant non-conductive material, such as hard rubber, are fitted into the mouths of the cells below the upper edges of the walls D' and E' and below the interior ledge L of the outside walls D, E, leaving gas and electrolyte collecting spaces above the absorbent material. The vent necks K' of these covers communicate with these gas spaces and project above the plane of the upper edges of the walls D, E and may be provided with suitable caps K'' to seal the cells and prevent deterioration of the electrodes. The space between such plane and the tops of the covers K is filled with a suitable electrolyte sealing substance H to seal the joints between the covers and cell walls. This sealing substance also covers the upper edges of the walls D', E'; enters the spaces between the limbs of the connectors T below the bends thereof, leaving such bends exposed as terminals for outside electrical connections. The spaces above the ledges L between the terminals T' and the walls of the cells are also filled with sealing substance, thereby effectively preventing electrical leakage between the various cells, and creepage of electrolyte along the connectors and terminals from one cell to another and out of the battery. To further prevent corrosion or peroxidation of the connectors T and terminals T', particularly those of the positive grids, such connectors and terminals are desirably dipped in or otherwise coated with pitch or a similar electrolyte-resistant substance.

Figs. 4 and 5 illustrate another method of preventing electrical leakage between the individual cells when a large number of them are combined in one unit. As shown, the walls separating the cells from one another are recessed to provide air spaces M, which are bridged only by the bends or exposed parts of the connectors T of the duplex electrodes. The recessed walls are substantially the height of the container and the tops of the cells are individually filled with sealing substance. Otherwise the construction of this battery may be similar to the one disclosed in Figs. 1, 2, and 3.

By the hereindisclosed improved pasting method, a number of cells may be produced in shorter time and at less expense than formerly. Moreover, the battery jar provides a non-conductive armoring form having recesses into which the active material is directly pasted. Such jar thus also acts as an armor for the active material to effectively protect the positive and negative blocks of active material from shedding and short circuiting. It will be understood that the improved direct pasting method may be applied to a single cell as well as to a multi-cell jar, and is not limited to use with a battery jar as the only form of nonconductive support or armoring, but may be utilized with other types of supporting means adapted to prevent shedding of active material. Other details of construction and assembly of the improved battery may be varied without departing from the principles of the invention.

I claim:

1. In a storage battery, the combination of a container, a series of horizontally arranged cells in said container having walls separating them from one another, each cell having a partition therein dividing the lower portion thereof into electrode compartments communicating with one another through a space above such partition, electrodes substantially filling said compartments, conductors connecting the electrodes of opposite polarity in adjoining cells of the series and extending over the intervening walls, such conductors being at least partly imbedded in a substance resisting creepage of electrolyte, and electrolyte in said cells above the electrodes therein.

2. In a storage battery, the combination of a plurality of cells integrally connected together by an intervening wall, partitions in the cells dividing the lower portions thereof into pairs of electrode compartments, electrodes in said compartments comprising grids carrying active material, the end grids of the plurality of cells having terminal conductors projecting outside the cells, a conductor extending over said intervening wall and joining the intermediate grids in duplex form, vented covers severally closing said cells, and sealing composition covering the joints between said covers and cells, the upper edge of said wall and at least part of said conductor.

3. In a storage battery, the combination of a series of cells integrally connected together by intervening walls, partitions in said cells parallel to said walls dividing the lower portions of said cells into pairs of electrode compartments, electrodes in said compartments comprising grids carrying active material, the end grids of the series of cells having terminal conductors projecting outside their cells, conductors joining the intermediate positive and negative grids in duplex form, such conductors extending over but spaced from the upper edges of said intervening walls, vented covers severally closing said cells, and sealing composition covering the joints between said covers and the cell walls, the upper edges of said intervening walls and portions of said terminal and intermediate conductors.

4. In a storage battery, the combination of a container having spaced longitudinal and transverse intersecting integral walls providing a plurality of groups or series of cells; said cells except the outside ones having common intervening walls; partitions within the cells formed integral with the bottoms thereof and dividing the lower portions of the interiors of said cells into electrode compartments; electrodes substantially filling said compartments and comprising positive and negative grids carrying blocks of active material, the grids of opposite polarity in the adjoining cells of each series being connected by conductors formed integral with the grids and extending over the upper edge of the intervening walls separating such cells; the end electrodes having conductors extending outside their cells; vented covers individually closing said cells; and sealing material covering the joints between the covers and cell walls, the upper ends of said intervening walls and parts of said conductors.

5. In a storage battery, the combination of a container, a series of cells arranged in horizontal relation therein and separated from one another by walls and air gaps, each cell having a partition therein dividing the lower portion thereof into electrode compartments, electrodes in said compartments comprising grids carrying active material, conductors connecting grids of opposite polarity in adjoining cells and extending across said air gaps, and electrolyte in said cells above the partitions and electrodes therein.

6. The method of making a multi-cell storage battery that comprises grouping a number of cells in adjoining relation; inserting grids in such cells, and simultaneously depositing active material on such grids.

7. The method of making a multiple-cell storage battery that comprises grouping a number of cells in adjoining relation; inserting positive and negative grids in said cells; depositing active material on such grids, after they are in position in the cells, to form electrodes, the deposition of active material on the grids of like polarity of all the cells of the group being carried on simultaneously; covering such electrodes with electrolyte absorbent material; and closing the cells.

8. In a method of making a multi-cell storage battery, grouping a number of cells in adjoining relation, such cells having separate compartments for positive and negative electrodes, and covering corresponding compartments in the several cells while depositing active material in the other compartments, and vice versa.

9. The method of making a multi-cell storage battery that comprises grouping a number of cells in adjoining relation; inserting positive and negative grids in such cells; and covering the grids of one polarity while applying active material to the grids of opposite polarity and vice versa, while all the grids are in position in their cells.

10. The method of making a multi-cell storage battery that comprises grouping a series of cells in a row, each of such cells having separate bottom compartments for positive and negative electrodes, inserting positive and negative grids in such compartments, covering the grids and compartments of one polarity while depositing active material in all of the grids and compartments of the other polarity, and vice versa, packing electrolyte absorbent material in the cell spaces above said electrodes, and closing said cells.

11. A storage battery electrode comprising a trough shape conductive active material-supporting member, the opposing faces of such member having tongues extending inwardly therefrom to provide projections for retaining active material in such grids and to provide perforations facilitating electrolytic action.

12. A storage battery electrode comprising a trough shape conductive active material-supporting member adapted to rest on the bottom of the battery container, active material in the open side of said member, and an inverted U-shape conductor having one limb integrally joined to one side of said trough, said conductor being adapted to fit over the side wall of the battery and hold the trough shape member in an upright position.

13. A duplex electrode for a multi-cell storage battery comprising a pair of grids U-shape in cross-section, the opposing faces of each grid having tongues extending inwardly therefrom to provide projections for retaining active material in such grids and to provide perforations facilitating electrolytic action, and an inverted U-shape conductor having its limbs integrally joined to the adjacent side walls of the pair of grids so that the open sides of the U-shaped grids will be uppermost when the conductor is fitted over a battery partition wall.

14. A method of making a storage battery that includes the step of heating the active material after it is in place in the battery jar.

15. A method of making a storage battery that comprises disposing active material in a heat-resistant battery jar, and thereafter heating such jar and the active material therein to bake the latter.

16. A method of making a storage battery that comprises arranging grids in a heat-resistant battery jar, applying active material to such grids after they are in said jar, and thereafter baking such active material.

In testimony whereof, I affix my signature.

RAYMOND C. BENNER.